US009195377B2

(12) United States Patent
Tytgat et al.

(10) Patent No.: US 9,195,377 B2
(45) Date of Patent: Nov. 24, 2015

(54) METHOD AND SYSTEM FOR PROVIDING CONSISTENCY BETWEEN A VIRTUAL REPRESENTATION AND CORRESPONDING PHYSICAL SPACES

(75) Inventors: Donny Tytgat, Antwerp (BE); Erwin Six, Antwerp (BE); Sammy Lievens, Antwerp (BE); Maarten Aerts, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 256 days.

(21) Appl. No.: 13/878,443

(22) PCT Filed: Nov. 3, 2010

(86) PCT No.: PCT/IB2010/003150
§ 371 (c)(1),
(2), (4) Date: Apr. 15, 2013

(87) PCT Pub. No.: WO2012/059780
PCT Pub. Date: May 10, 2012

(65) Prior Publication Data
US 2013/0219302 A1    Aug. 22, 2013

(51) Int. Cl.
*G06F 3/0484* (2013.01)
*A63F 13/30* (2014.01)
*H04N 7/15* (2006.01)
*G06T 19/00* (2011.01)

(52) U.S. Cl.
CPC .............. *G06F 3/0484* (2013.01); *A63F 13/12* (2013.01); *G06T 19/00* (2013.01); *H04N 7/15* (2013.01); *A63F 2300/1093* (2013.01); *A63F 2300/5573* (2013.01); *A63F 2300/572* (2013.01); *A63F 2300/6623* (2013.01); *A63F 2300/6684* (2013.01); *A63F 2300/8082* (2013.01); *G06T 2219/024* (2013.01)

(58) Field of Classification Search
CPC ...................................................... G06F 3/0484
USPC ......................................................... 715/757
See application file for complete search history.

(56) References Cited

U.S. PATENT DOCUMENTS

| | | |
|---|---|---|
| 2003/0234859 A1 | 12/2003 | Malzbender et al. |
| 2005/0168402 A1 | 8/2005 | Culbertson et al. |
| 2005/0253872 A1 | 11/2005 | Goss et al. |
| 2006/0244817 A1 * | 11/2006 | Harville et al. ............ 348/14.08 |
| 2009/0327418 A1 | 12/2009 | Zhang et al. |

FOREIGN PATENT DOCUMENTS

CN          1863301          11/2006

* cited by examiner

*Primary Examiner* — Andrea Leggett
(74) *Attorney, Agent, or Firm* — Patti & Malvone Law Group, LLC

(57) ABSTRACT

An exemplary method of providing a virtual representation includes determining a plurality of position constraints that correspond to physical positions of individuals relative to each other. A plurality of determined viewing constraints each correspond to a position of one of the individuals relative to a display used by that individual for viewing the virtual representation. Relative positions of virtual representations of the individuals in the virtual representation are determined to correspond to the determined position and viewing constraints.

10 Claims, 3 Drawing Sheets

METHOD AND SYSTEM FOR PROVIDING CONSISTENCY BETWEEN A VIRTUAL REPRESENTATION AND CORRESPONDING PHYSICAL SPACES

FIELD OF THE INVENTION

This invention generally relates to virtual reality. More particularly, this invention relates to providing a virtual representation.

DESCRIPTION OF THE RELATED ART

There are various types of virtual reality systems. Typical applications include presenting a virtual space or environment that an individual can observe on a display screen. A visual representation of a character or individual allows for the person in the real world to virtually interact with that which is happening in the virtual space. For example, many video games have a virtual world type of display in which a character in the game moves about within the virtual space based upon input to a game controller from an individual playing the game.

One limitation on such systems is that it requires a manual control device to translate the individual's hand movements from the real world into commands that result in motion displayed in the virtual world. Such systems do not allow the individual to actually walk around to cause corresponding movement within the virtual world, for example. Other systems attempt to address this by including a camera control that allows an individual to move around in a physical space to cause corresponding motion displayed on the screen in the virtual space. One limitation on known systems that use this approach is that there is a limited, calibrated box or space within which the individual must remain while participating in the virtual environment. Additionally, there is typically no correspondence between physical objects in the real world and virtual objects in the virtual space.

More complicated systems are proposed including virtual reality suits that have sensors for detecting motion of different portions of an individual's body. These systems allow for actual, physical motion to be well represented by corresponding motion in the virtual environment. A limitation, however, is that there is typically no correspondence between physical objects in the real world and virtual objects in the virtual space. When an individual sits on a physical chair, the representation of that individual in the virtual world typically will not be sitting on any particular object in the virtual world, for example.

Another complication is introduced when more than one individual from the real world is represented in the virtual world. There typically is no way of coordinating the respective representations so that they correspond to actual relative positions between the individuals in the real world.

SUMMARY

An exemplary method of presenting a virtual representation includes determining a plurality of position constraints that correspond to positions of individuals relative to each other. A plurality of viewing constraints are determined. Each of the viewing constraints corresponds to a position of one of the individuals relative to a display used by that individual for viewing the virtual representation. Relative positions of virtual representations of the individuals in the virtual representation are determined. The relative positions of the virtual representations of the individuals correspond to the determined position and viewing constraints.

An exemplary system for providing a virtual representation includes at least one processor that is configured to determine a plurality of position constraints that correspond to positions of individuals relative to each other. The processor also determines a plurality of viewing constraints that each correspond to a position of one of the individuals relative to a display used by the one individual for viewing the virtual representation. The processor determines relative positions of virtual representations of individuals in the virtual representation. The relative positions correspond to the determined position and viewing constraints.

The various features and advantages of a disclosed example will become apparent to those skilled in the art from the following detailed description. The drawings that accompany the detailed description can be briefly described as follows.

BRIEF DESCRIPTION OF THE DRAWINGS

FIG. 3 schematically illustrates another example plurality of source spaces.

DETAILED DESCRIPTION

Figure 1:
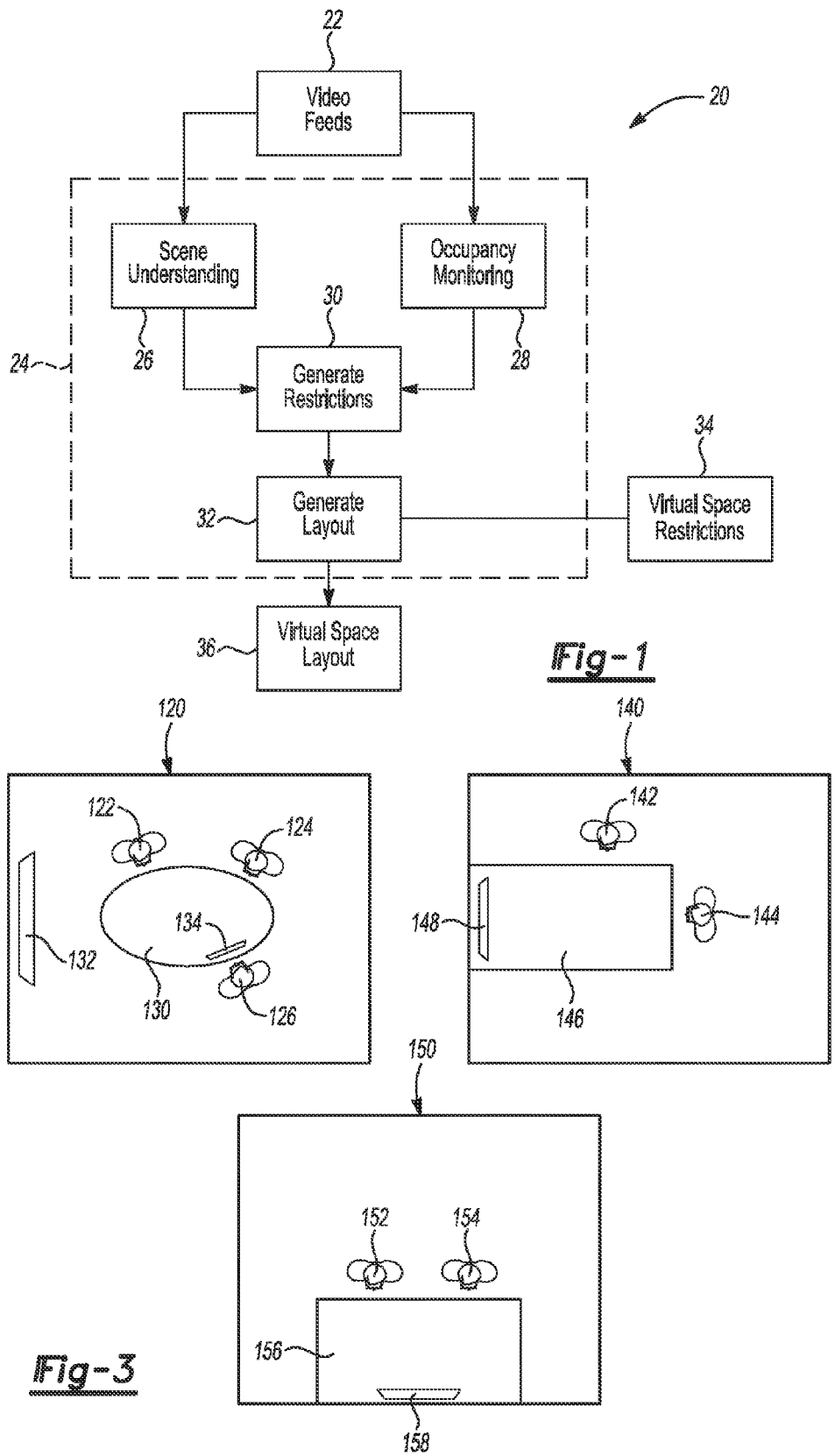
FIG. 1 schematically illustrates a system and methodology for providing a virtual representation designed according to an embodiment of this invention.

FIG. 1 schematically illustrates a system 20 for providing a virtual representation that includes consistency between the virtual representation and the real world conditions that it represents. The consistency facilitates more acceptable and realistic interaction with the virtual representation. There are a variety of uses for such a virtual representation. For purposes of discussion, a teleconferencing application is considered within this description. Other applications of the disclosed techniques are possible. Those skilled in the art who have the benefit of this description will be able to implement the described techniques for their particular situation.

The example of FIG. 1 includes a plurality of video feeds 22. In this example, there is more than one source space that provides video information to be incorporated into the virtual space, which is a virtual representation of the source spaces combined into a single virtual space. The video feeds 22 come from cameras, for example, that provide information regarding the contents of a source space such as a conference room used for a teleconference.

A processor 24 utilizes the information from the video feeds 22 to develop a virtual representation of the source spaces. A scene understanding module 26 processes the video information using known techniques for discerning the arrangement of the source space. The scene understanding module 26 determines locations of walls, positions of furniture and other characteristics of a source space.

An occupancy monitoring module 28 uses known techniques for determining positions of individuals within the source space. The occupancy monitoring module 28 may keep track of movement of individuals as they move about within the source space, for example.

Known video analysis techniques are used in this example for purposes of obtaining information that accurately describes the contents and activity within a source space.

A constraint generating module 30 determines a plurality of constraints on the virtual representation so that the virtual representation will correspond to the physical layouts and the contents of the source spaces. In this example, the constraint generating module 30 is configured to determine constraints that correspond to the source space layout and the physical locations of individuals relative to each other within each source space. In this example, the constraint generating module 30 determines a plurality of position constraints that correspond to positions of individuals relative to each other in each source space. The example constraint generating module 30 also determines a plurality of viewing constraints that each correspond to information regarding a position of one of the individuals relative to a display used by that individual for viewing the virtual representation. The position constraints and viewing constraints place restrictions on how the virtual space can be arranged and on the placement of the virtual representations of the individuals within the virtual space.

A layout generating module 32 utilizes the constraint information from the constraint generating module 30 to determine a layout of the virtual space. One example includes using an optimization technique in which the constraints are considered to define an optimization problem. The layout generating module 32 effectively takes into account the real world constraints regarding the locations of the individuals when composing the virtual space. The position constraints ensure that the virtual representations of individuals has correspondence to the actual physical relative locations between them. The viewing constraints ensure that when a person in the real world looks at a screen that shows the virtual representation, the virtual representations of individuals on the screen are situated in a corresponding manner. This ensures consistency between the real world and the virtual world in the experience of each individual as they interact with the virtual space.

The example of FIG. 1 also includes virtual space restrictions 34 that place limitations or restrictions on how the layout generating module 32 can configure the virtual space. Example virtual space restrictions include maximum room size and a required minimum distance between virtual representations of individuals, for example. The virtual space restrictions 34 are incorporated into the optimized layout provided by the layout generating module 32.

The virtual space layout is provided at 36 and presented on a display to individuals who intend to interact with the virtual world.

Figure 2:
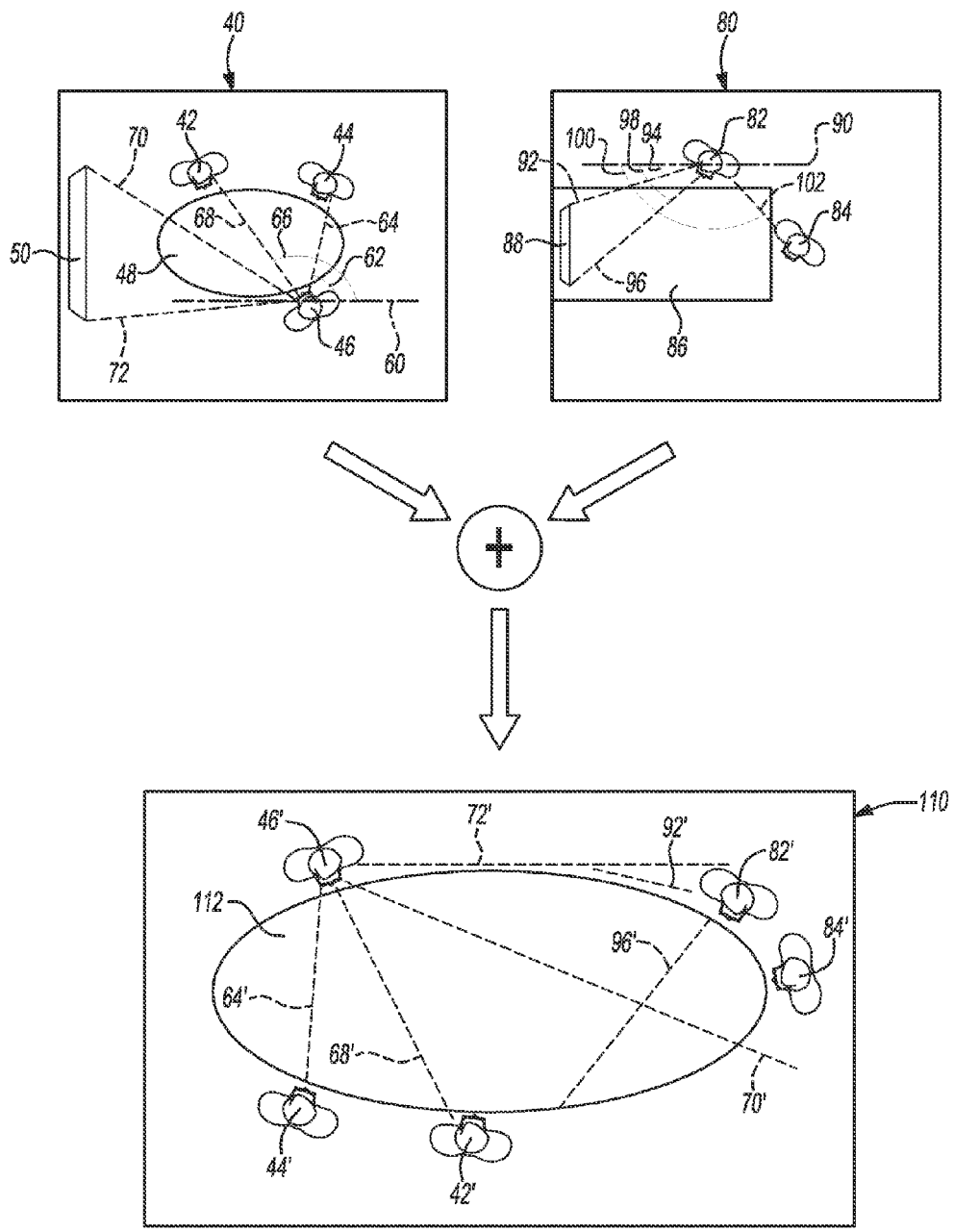
FIG. 2 schematically illustrates an example plurality of source spaces and a corresponding virtual space.

FIG. 2 schematically illustrates an example situation in which five individuals will participate on a teleconference within a virtual environment. In this example, there are two different source spaces each corresponding to a conference room in which the participants of the teleconference are located. A first source space is a conference room in which individuals 42, 44 and 46 are situated around a table 48. A display 50 within the source space 40 provides the individuals 42, 44 and 46 with the ability to observe the virtual space and the individuals with which they will be teleconferencing.

The position constraints determined by the constraint generating module 30 for the source space 40 are schematically shown with respect to the individual 46 as an example. A reference plane or line 60 corresponds to, for example, a line of sight of a camera that provides one of the video feeds 22 or another basis for a reference. A first angle 62 describes the relative position of the individual 44 relative to the individual 46. As can be appreciated from the schematic illustration, the angle 62 corresponds to an angle between the reference line 60 and a line of sight 64 along which the individual 46 would look at the individual 44. A second angle 66 describes the relative position of the individual 42 relative to the individual 46. The angle 66 corresponds to an angle between the reference line 60 and a line of sight 68 between the individual 46 and the individual 42. In this example, the first angle 62 is approximately 75° and the second angle 66 is approximately 120°. The angles 62 and 66 provide some of the position constraint information regarding the first source space 40. There will be additional position constraint information based upon the individual 42 as the reference for purposes of describing the relative positions of the individuals 44 and 46 relative to the position of the individual 42. Similarly, position constraint information will describe the relative positions of the individuals 42 and 46 relative to the individual 44. Only the angles for describing position information relative to the individual 46 and the reference line 60 are schematically shown in FIG. 2. The other position constraint information is not illustrated for simplicity.

The constraint generating module 30 also determines viewing constraints for each of the individuals within the first source space 40. Again taking the individual 46 as an example, the display 50 is within a viewing cone of the individual 46 between reference lines 70 and 72. The schematic reference line 70 corresponds to a line of sight between the individual 46 and one edge of the display 50 while the schematic reference line 72 corresponds to a line of sight between the individual 46 and an opposite edge of the display 50. Each of the schematic reference lines 70 and 72 can be described with an angle relative to the reference line 60. This allows for describing the viewing cone as having the display 50 being located between 105° and 190° from the reference for the individual 46, for example.

Similar viewing constraint information is determined for each of the individuals 42 and 44. The other viewing constraint information is not illustrated in FIG. 2 for simplicity.

One aspect of the viewing constraint information is that it places limitations on the positions of individuals and objects within other source spaces relative to the positions of the individuals 42, 44 and 46 within the first source space when all of those positions are incorporated into the virtual space. For example, the individual 46 looks at the display 50 for purposes of observing an individual in another source space. The virtual representation of such an individual relative to the virtual representation of the individual 46 should fit within a corresponding virtual viewing cone or between virtual reference lines corresponding to the reference lines 70 and 72 in the layout of the virtual space to provide consistency. When the individual 46 looks in the direction of the display 50 in the real world, the virtual representation of the individual 46 will have the same perspective when looking at another virtual representation of another individual within the virtual space, for example.

A second source space 80 is schematically illustrated in FIG. 2. The second source space 80 is another conference room occupied by two individuals 82 and 84 in this example. A table 86 and display 88 are provided within the conference room that establishes the second source space 80.

Position constraint information from the second source space 80 is schematically illustrated relative to a reference plane or line 90 and the individual 82. A line of sight reference line 92 between the individual 82 and the one edge of the display 88 is positioned at a first angle 94 relative to the reference line 90. A second line of sight reference line 96 is between the individual 82 and an opposite edge of the display 88. The reference line 96 is at a second angle 98 relative to the reference line 90. The viewing cone of the individual 82 for the viewing constraint information from the second source space 80 is between the reference lines 92 and 96 or between the angles 94 and 98. Such viewing constraint information describes the relative orientation of the display 88 and the individual 82 for purposes of providing consistency in the virtual representation as observed by the individual 82, for example.

Position constraint information is schematically illustrated by the angle 100 between a line of sight reference line 102 from the individual 82 to the individual 84. In this example, the position constraint information may comprise describing the individual 84 as being at an angle of 135° relative to the individual 82.

Additional position constraints and viewing constraints are determined relative to the individual 84. Those constraints are not schematically illustrated for simplicity.

The first source space 40 and the second source space 80 are merged into a single virtual space 110. The virtual space layout generating module 32 utilizes the constraint information and determines an optimum layout for the virtual space to satisfy the position constraints and the viewing constraints as much as possible. The virtual space 110 in this example comprises a virtual representation of a single conference room occupied by all of the individuals 42, 44, 46, 82 and 84. A virtual representation of each individual is shown around a virtual representation of a single conference room table 112 in the virtual space 110.

As can be appreciated from the illustration, the relative positions of the virtual representations of the individuals is consistent with the position constraints and viewing constraints in the actual source spaces 40 and 80. The virtual representation of the individual 46' is positioned relative to the virtual representations of the individuals 42' and 44' in a manner that corresponds to their relative physical locations in the first source space 40. The relative angles of the lines of sight 64 and 68 in the source space 40 correspond to the relative angles of the corresponding lines of sight in the virtual space 110 schematically shown at 64' and 68', respectively. Additionally, the virtual representations of the individuals 82' and 84' are within a virtual viewing cone of the virtual representation of the individual 46'. The reference lines 70' and 72' correspond to the reference lines 70 and 72 in the source space 40. The virtual representations of the individuals 82' and 84' are, therefore, relative to the virtual representation of the individual 46' in positions that provides consistency between the perspective of the individual 46 looking at the display 50 in the first source space 40 and the perspective of the individual 46' in the virtual space 110.

The angle between the lines 70 and 72 need not exactly match the angle between the lines 70' and 72'. Provided that there is sufficient correspondence between them, a consistency exists between the virtual representation in the virtual space 110 and the experience of the individual 46 within the first source space 40.

As can be appreciated from the illustration, the position and viewing constraints from the second source space 80 are also satisfied or accommodated as closely as possible within the virtual space 110. The relative positions of the virtual representations of the individuals 82' and 84' is similar to the relative actual positions between the individuals 82 and 84 in the second source space 80. Additionally, the positions of the virtual representations of the individuals 42', 44' and 46' are within a viewing cone of the virtual representation of the individual 82', for example, that corresponds to the actual viewing cone of the individual 82 as that individual is looking at the display 88. As can be appreciated from the illustration, the virtual viewing cone indicated by the reference lines 92' and 96' is wider than the actual viewing cone in the second source space 80 between the reference lines 92 and 96. Although the angle describing the viewing cone is not an identical match with the angle describing the virtual viewing cone, there is sufficient correspondence between them to provide consistency so that the experience of the individual 82 is well represented within the virtual space 110. In other words, when the individual 82 is looking at the display 88 in the second source space 80, the virtual representation of the individual 82' has a similar orientation relative to the individual 84' and the individuals 46', 44' and 42' within the virtual space 110.

FIG. 3 schematically illustrates another example teleconference scenario. This example includes three source spaces that are all incorporated into a single virtual space. Any number of source spaces can be incorporated into the virtual space. Three are included in this example. A first source space 120 is occupied by individuals 122, 124 and 126. These individuals are situated around a table 130 within a conference room. A large display 132 provides an ability for the individuals 122, 124 and 126 to observe the virtual space to participate in the teleconference. In this example, the individual 126 has a separate display 134 that the individual 126 will use for purposes of participating in the virtual teleconference. The display 134 may be on a notebook computer, for example.

A second source space 140 comprises a conference room occupied by individuals 142 and 144. The second source space 140 includes a table 146 and a display 148.

A third source space 150 is occupied by individuals 152 and 154. The third source space 150 includes a table 156 and a display 158.

The constraint generating module 30 determines position constraints and viewing constraints for each of the source spaces 120, 140 and 150. The layout generating module 32 utilizes all of the constraint information to determine an optimum layout of the virtual space to provide consistency between the conditions in the real world and the conditions represented in the virtual space.

One aspect of this example is that the individual display 134 used by the individual 126 should have a different virtual space layout to accommodate the different position of the display 134 relative to the individual 126 compared to how the other individuals observe the other displays within the respective source spaces.

Figure 4:
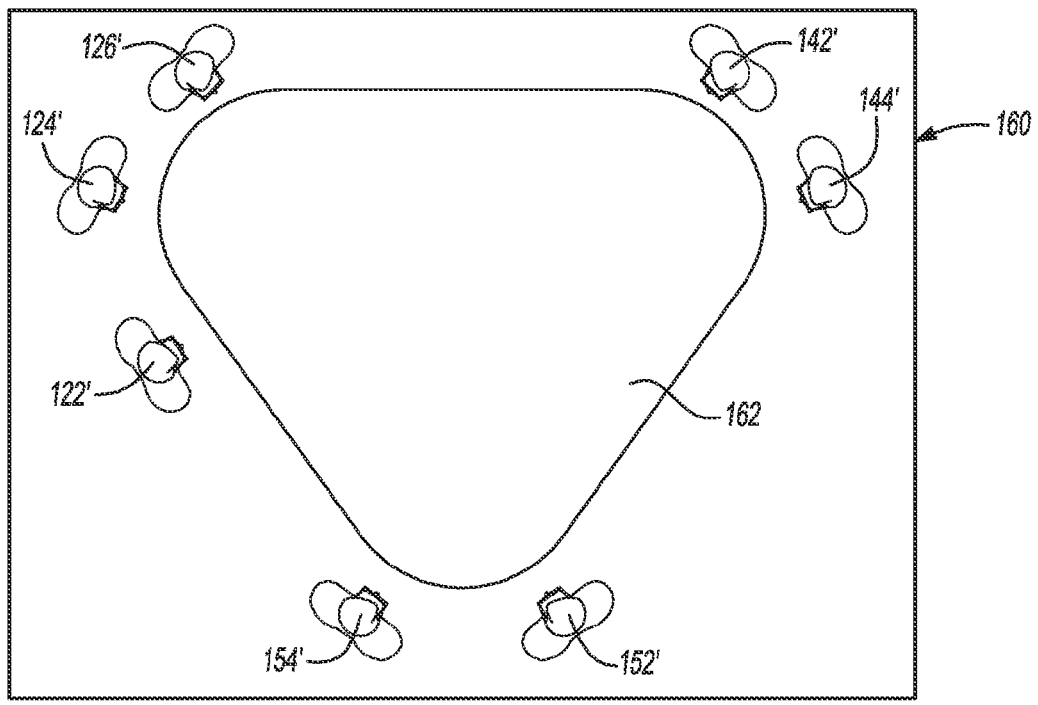
FIG. 4 schematically illustrates a virtual space corresponding to the source spaces from FIG. 3.

FIG. 4 schematically illustrates an example virtual space 160 that combines the source spaces 120, 140 and 150 into a single virtual space. The virtual space 160 includes a single conference room table representation 162 and virtual representations of all seven individuals participating in the teleconference. As can be appreciated by comparing FIGS. 3 and 4, the relative positions of the individual representations in the virtual space 160 corresponds to the relative positions of the individuals in each source space. For example, the virtual representation of the individual 124' is between the virtual representation of the individual 126' and the virtual representation of the individual 122' with the same relationship between them. There may be some differences between the actual physical distances between those individuals and their corresponding virtual representations. There may also be some differences in the relative angles between them because of the requirements of satisfying the constraints from all of the source spaces. At the same time, however, there is consistency between the relative positions in the real world and the relative positions in the virtual space 160. The same is true regarding the relative positions of the individuals from the other two source spaces.

It can also be appreciated by comparing FIGS. 3 and 4 that the viewing constraints have been satisfied or accommodated as closely as possible. For example, when the individual 124 is looking at the display 132, the corresponding virtual representation 124' of that individual is virtually looking at the virtual representations of the individuals 142', 144', 152' and 154' within a virtual viewing cone that corresponds to the actual viewing cone of the individual 124 in the first source space 120. The same is true regarding the other individuals that are virtually represented within the virtual space 160.

Figure 5:
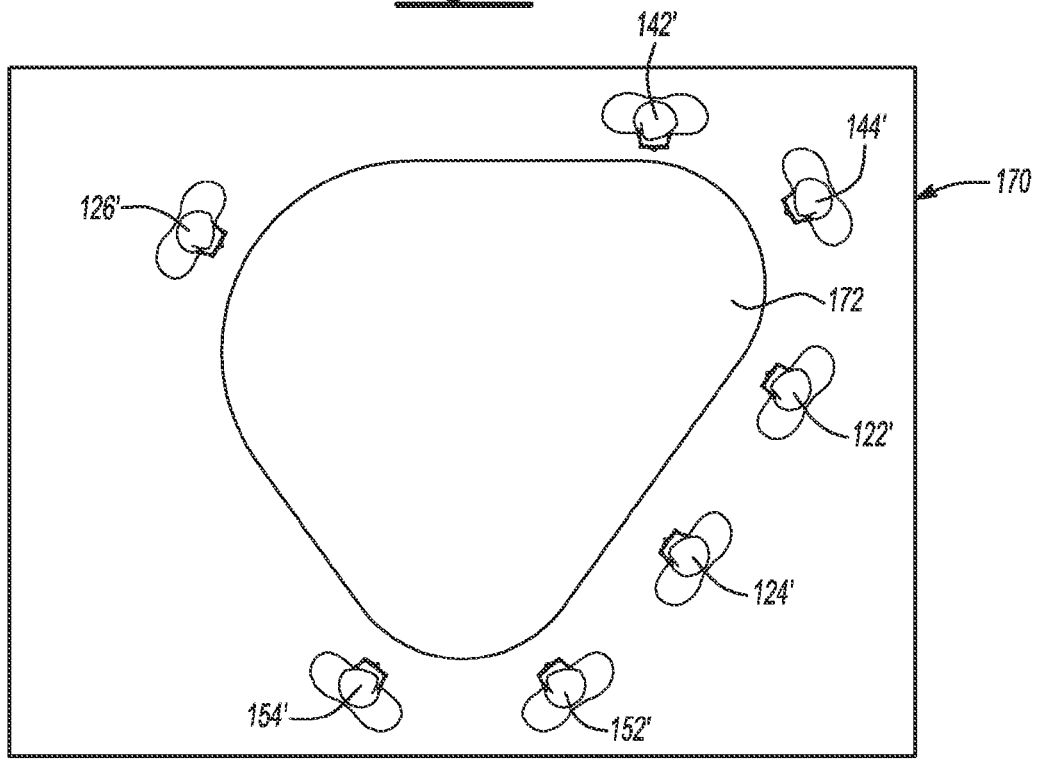
FIG. 5 schematically illustrates another virtual space corresponding to the source spaces from FIG. 3.

FIG. 5 schematically illustrates a virtual space 170 that corresponds to the layout generated for purposes of providing a virtual representation on the display 134. In this case, only the individual 126 is looking at the display 134. As can be appreciated by comparing FIGS. 4 and 5, the configuration of a conference table representation 172 is different compared to the representation of the conference table 162. Moreover, the positions of the individuals within the virtual space 170 is altered compared to the positions in the virtual space 160. This accommodates the difference between the individual 126 looking at the display 134 directly in front of her compared to the other individuals participating in the teleconference looking at a display across a table from them at angles corresponding to their relative positions in the room.

In the virtual space 170, the virtual representations of the individuals 122' and 124' are across the virtual table representation 172 from the virtual representation of the individual 126'. This provides consistency in that when the individual 126 is looking at the display 134 in the source space 120, the individuals 122 and 124 are across the table from the individual 126. Moreover, if the individual 126 were to look at the display 134 and then slightly above it, the individual 126 will see the virtual representation of the individuals 122' and 124' on the display 134 approximately lined up with the actual position of the individuals 122 and 124, respectively, in the real world. At the same time, the position of the individual representations 142' and 144', 152' and 154' all fit within a virtual viewing cone relative to the virtual representation of the individual 126' corresponding to a viewing cone of the individual 126 looking at the display 134. This is an example of how the disclosed method and system provide a consistent experience for an individual interacting with a virtual world.

The examples of FIGS. 4 and 5 demonstrate how the disclosed example system and method accommodate a variety of conditions within any number of real world source spaces and provide a virtual space representation that is consistent with those conditions in the real world. Each of the individuals participating in the teleconference example of FIG. 3 has a virtual experience consistent with the real world when they observe the virtual space on the display of their choice. The position constraint information and viewing constraint information provides such a consistent experience for all of the individuals even when different displays are used by those individuals.

Two virtual space representations are shown in FIGS. 4 and 5 in this example situation. It is possible to provide more virtual representations for a given situation when more displays are used and each should have a unique virtual representation to provide the corresponding observers with a virtual experience that is consistent with their real world situation.

The preceding description is exemplary rather than limiting in nature. The scope of legal protection given to this invention can only be determined by studying the following claims.

We claim:

1. A method of presenting a virtual representation of individuals relative to each other wherein a first one of the individuals is outside of physical view of a second one of the individuals, comprising the steps of:
   determining a plurality of position constraints that correspond to positions of individuals relative to each other;
   determining a plurality of viewing constraints each corresponding to a position of one of the individuals relative to a display used by the one individual for viewing the virtual representation wherein the determined viewing constraint regarding the first individual includes the display used by the first individual being within a viewing cone of the first individual and the virtual representation of the second individual is within a corresponding viewing cone of the virtual representation of the first individual; and wherein the determined viewing constraint regarding the second individual includes the display used by the second individual being within a viewing cone of the second individual and wherein the virtual representation of the first individual is within a corresponding viewing cone of the virtual representation of the second individual; and
   determining relative positions of virtual representations of the individuals in the virtual representation corresponding to the determined position and viewing constraints by placing the virtual representation of the first individual relative to the virtual representation of the second individual to satisfy the determined viewing constraint regarding the second individual; and
   placing the virtual representation of the second individual relative to the virtual representation of the first individual to satisfy the determined viewing constraint regarding the first individual.

2. The method of claim 1, wherein some of the individuals are in a first physical space and others of the individuals are in a second physical space, each physical space has at least one display and the method comprises
   providing a single virtual representation of all of the individuals in a single virtual space corresponding to the first and second physical spaces such that all of the virtual representations of all of the individuals are in the single virtual space.

3. The method of claim 2, wherein there are at least two displays in the first physical space and the method comprises
   providing a first single virtual representation on one of the at least two displays, the first single virtual representation being within a viewing cone corresponding to a position of the individual who uses the one of the at least two displays, relative to the one of the at least two displays; and
   providing a second, different single virtual representation on the other of the at least two displays, the second single virtual representation being within a viewing cone corresponding to a position of the individual who uses the other of the at least two displays, relative to the other of the at least two displays.

4. The method of claim 1, comprising
   determining a layout of the virtual representation that satisfies as many of a plurality of virtual constraints as possible, the virtual constraints placing limitations on features of the virtual representation.

5. A system for presenting a virtual representation of individuals relative to each other wherein a first one of the individuals is outside of physical view of a second one of the individuals, the system comprising:

at least one processor configured to determine a plurality of position constraints that correspond to positions of individuals relative to each other;

determine a plurality of viewing constraints each corresponding to a position of one of the individuals relative to a display used by the one individual for viewing the virtual representation wherein the determined viewing constraint regarding the first individual includes the display used by the first individual being within a viewing cone of the first individual and the virtual representation of the second individual is within a corresponding viewing cone of the virtual representation of the first individual; and wherein the determined viewing constraint regarding the second individual includes the display used by the second individual being within a viewing cone of the second individual and wherein the virtual representation of the first individual is within a corresponding viewing cone of the virtual representation of the second individual; and determine relative positions of virtual representations of the individuals in the virtual representation corresponding to the determined position and viewing constraints by placing the virtual representation of the first individual relative to the virtual representation of the second individual to satisfy the determined viewing constraint regarding the second individual; and placing the virtual representation of the second individual relative to the virtual representation of the first individual to satisfy the determined viewing constraint regarding the first individual.

6. The system of claim 5, wherein some of the individuals are in a first physical space and others of the individuals are in a second physical space, each physical space has at least one display and wherein the processor is configured to provide a single virtual representation of all of the individuals in a single virtual space corresponding to the first and second physical spaces such that all of the virtual representations of all of the individuals are in the single virtual space.

7. The system of claim 6, wherein there are at least two displays in the first physical space and wherein the processor is configured to provide a first single virtual representation on one of the at least two displays, the first single virtual representation being within a viewing cone corresponding to a position of the individual who uses the one of the at least two displays, relative to the one of the at least two displays; and provide a second, different single virtual representation on the other of the at least two displays, the second single virtual representation being within a viewing cone corresponding to a position of the individual who uses the other of the at least two displays, relative to the other of the at least two displays.

8. A non-transitory computer-readable storage device storing a computer-executable program comprising a plurality of instructions which, when executed by a processor of a computing device cause the processor to perform a method of:

determine a plurality of position constraints that correspond to positions of individuals relative to each other;

determine a plurality of viewing constraints each corresponding to a position of one of the individuals relative to a display used by the one individual for viewing the virtual representation wherein the determined viewing constraint regarding the first individual includes the display used by the first individual being within a viewing cone of the first individual and the virtual representation of the second individual is within a corresponding viewing cone of the virtual representation of the first individual; and wherein the determined viewing constraint regarding the second individual includes the display used by the second individual being within a viewing cone of the second individual and wherein the virtual representation of the first individual is within a corresponding viewing cone of the virtual representation of the second individual; and determine relative positions of virtual representations of the individuals in the virtual representation corresponding to the determined position and viewing constraints by placing the virtual representation of the first individual relative to the virtual representation of the second individual to satisfy the determined viewing constraint regarding the second individual; and placing the virtual representation of the second individual relative to the virtual representation of the first individual to satisfy the determined viewing constraint regarding the first individual.

9. The non-transitory computer-readable storage device storing a computer-executable program of claim 8, wherein some of the individuals are in a first physical space and others of the individuals are in a second physical space and wherein the instructions comprise further instructions for directing a computer to provide a single virtual representation of all of the individuals in a single virtual space corresponding to the first and second physical spaces such that all of the virtual representations of all of the individuals are in the single virtual space.

10. The non-transitory computer-readable storage device storing a computer-executable program of claim 9, wherein there are at least two displays in the first physical space and wherein the instructions comprise further instructions for directing a computer to provide a first single virtual representation on one of the at least two displays, the first single virtual representation being within a viewing cone corresponding to a position of the individual who uses the one of the at least two displays, relative to the one of the at least two displays; and provide a second, different single virtual representation on the other of the at least two displays, the second single virtual representation being within a viewing cone corresponding to a position of the individual who uses the other of the at least two displays, relative to the other of the at least two displays.

* * * * *